Figure 4:
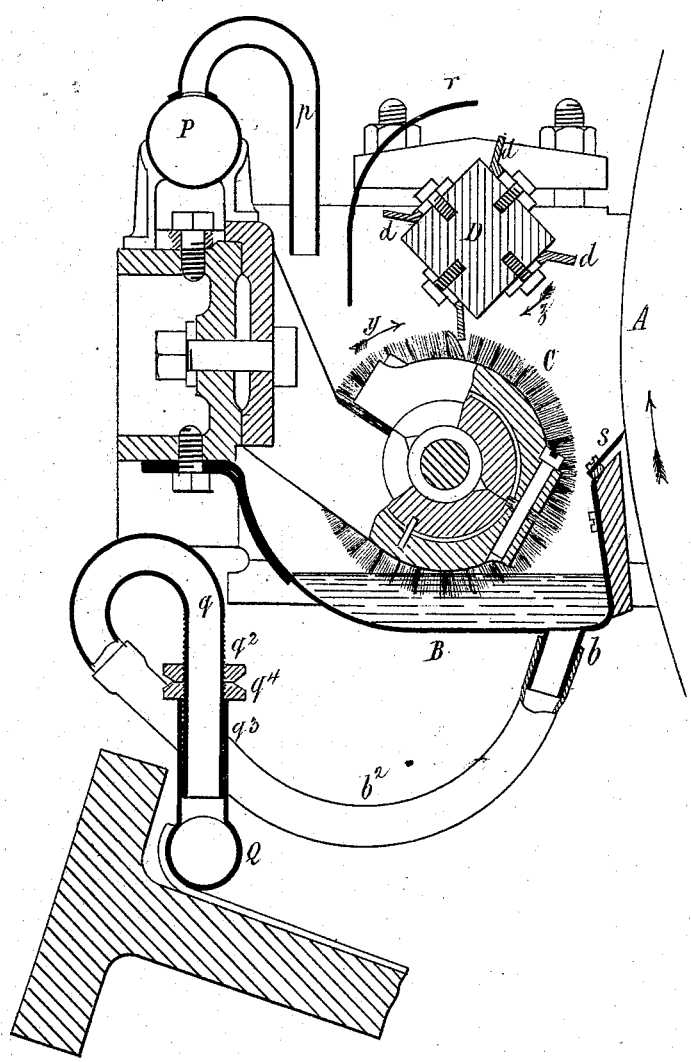

(No Model.) 3 Sheets—Sheet 1.
A. L. BRUCE, G. STENHOUSE, W. McCOWAN & A. HADDOW.
Treatment of Dextrine Maltose, &c., and Apparatus therefor.
No. 240,651. Patented April 26, 1881.
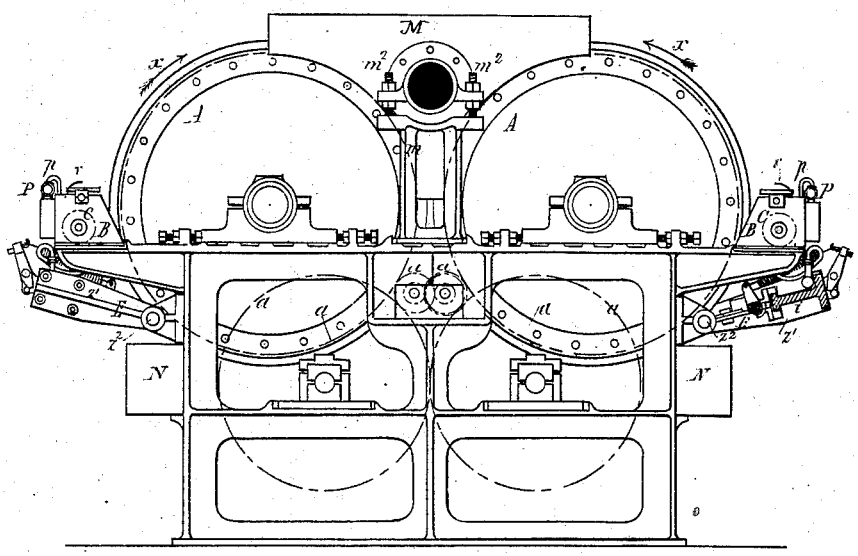
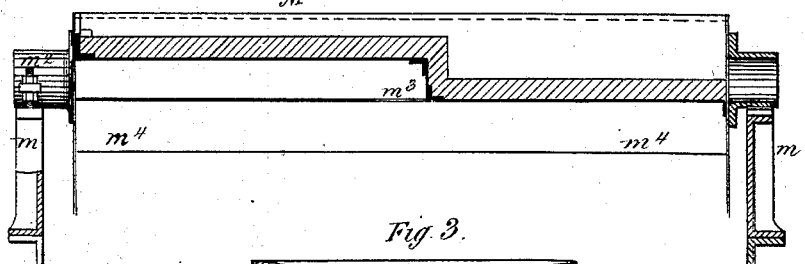
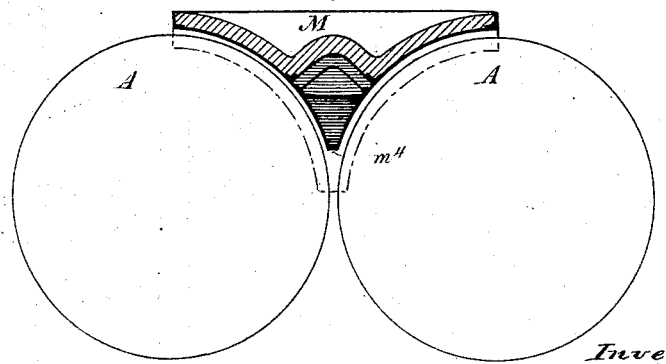

(No Model.)
3 Sheets—Sheet 3.
A. L. BRUCE, G. STENHOUSE, W. McCOWAN
& A. HADDOW.
Treatment of Dextrine Maltose, &c., and Apparatus therefor.
No. 240,651.
Patented April 26, 1881.
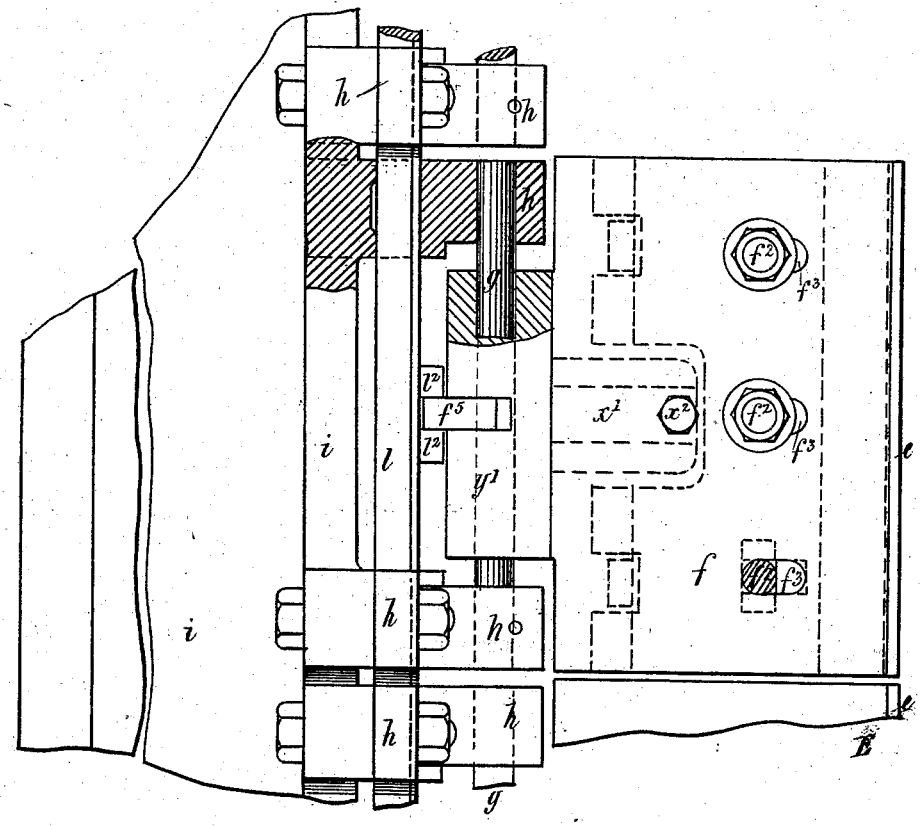
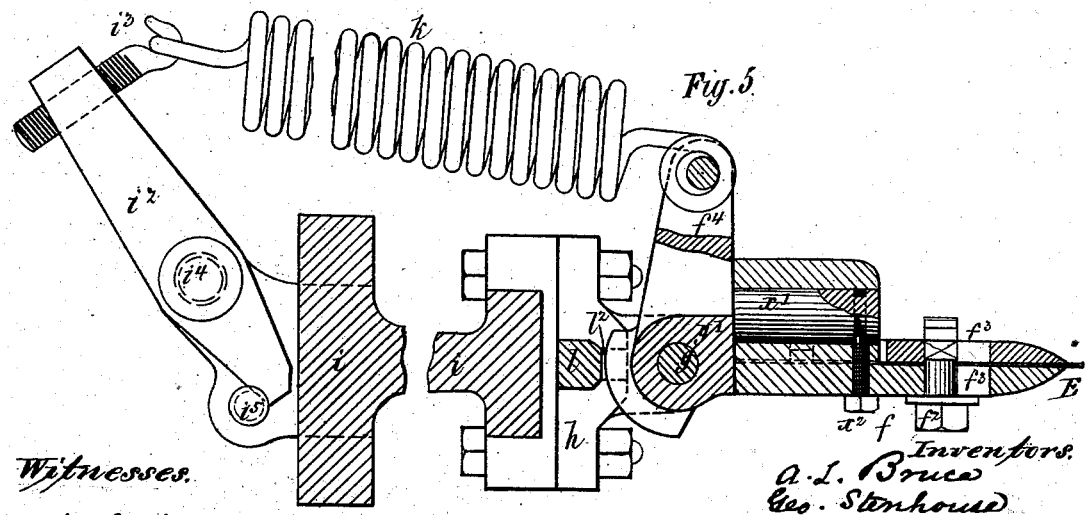

UNITED STATES PATENT OFFICE.

ALEXANDER LOW BRUCE, GEORGE STENHOUSE, WILLIAM McCOWAN, AND ANDREW HADDOW, OF EDINBURGH, COUNTY OF EDINBURGH, NORTH BRITAIN, ASSIGNORS TO WILLIAM YOUNGER & CO., OF SAME PLACE.

TREATMENT OF DEXTRINE MALTOSE, &c., AND APPARATUS THEREFOR.

SPECIFICATION forming part of Letters Patent No. 240,651, dated April 26, 1881.

Application filed March 14, 1881. (No model.) Patented in England August 12, 1879.

*To all whom it may concern:*

Be it known that we, ALEXANDER LOW BRUCE, of the firm of William Younger & Co., brewers, GEORGE STENHOUSE, brewer to the said firm, WILLIAM McCOWAN, and ANDREW HADDOW, all of the city and county of Edinburgh, North Britain, have invented Improvements in the Treatment of Dextrine Maltose and Analogous Substances, and Machinery or Apparatus by which the said improvements are effected, (for which we have received Letters Patent of the United Kingdom of Great Britain and Ireland, No. 3,230, dated the 12th day of August, 1879,) of which the following is a specification.

Dextrine maltose, glucose, malt worts, (hopped and unhopped,) and other analogous substances have hitherto been commercially obtained in a state of glutinous or viscous liquid, or in a solid and massive state, containing a varying percentage of water, and the object of our invention is to obtain dextrine maltose in a dry pulverulent condition, or in such condition that when cold it can be readily pulverized, and glucose, malt worts, (hopped and unhopped,) and other analogous substances in such a dry condition that when cold they can be readily pulverized without material injury to the color and properties thereof. This object is effected by expelling the whole, or nearly the whole, of the water or other liquid from the before-mentioned substances or bodies by subjecting them to the action of heat, in the manner hereinafter described, whereby the product dextrine maltose is obtained in a dry pulverulent state, and saccharine substances in such a dry condition that when cold they can be readily pulverized. Various arrangements of mechanism of the character hereinafter referred to are suitable for so desiccating the dextrine maltose, glucose, malt worts, (hopped and unhopped,) and analogous substances; but we find the apparatus hereinafter described with reference to the accompanying drawings specially suited both for desiccating and for collecting the dextrine maltose in the desiccated pulverulent state, and glucose, malt-wort, (hopped and unhopped,) and analogous substances in such a dry condition that when cold they can be readily pulverized.

Figure 1 represents a machine or apparatus constructed or arranged according to our invention for treating dextrine maltose, or glucose, or analogous saccharine substances. In the following description it is supposed that dextrine maltose is under treatment; but it will be understood that the same description would apply to the treatment of glucose or analogous substances. Fig. 2 is a longitudinal section, and Fig. 3 a transverse section, of the hereinafter described hood for carrying hot air to the said dextrine maltose. Fig. 4 is a transverse section of one of the troughs which contain the liquid or semi-liquid dextrine maltose to be treated according to our invention, the said figure also showing other parts, as hereinafter described. Fig. 5 is a transverse section, and Fig. 6 a plan, of under side of one of the sections of scrapers or knives by which the dried or desiccated dextrine maltose is detached from the cylinders, as also hereinafter described.

Metal cylinders or drums A are mounted in the framing of the machine in proximity to each other, their peripheries preferably nearly touching, as shown in Figs. 1 and 3. These cylinders are heated by steam, gas, fuel, or equivalent means, but preferably by steam, this heating being effected in any of the known and convenient methods of heating cylinders—for instance, by forming the trunnions or axes of the cylinders hollow and passing steam into them thereby, the water of condensation being passed therefrom by one of the hollow trunnions by a scoop or its equivalent, such as is employed in the cylinders of paper-making machines. When steam is used we have found that with iron cylinders a pressure of steam of not less than thirty pounds per square inch should be employed; but we do not limit ourselves to this. At and extending along the outer side of each of these cylinders is a horizontal trough, B, into each of which is passed from a pipe, P, in measured quantity, by a pump or its equivalent, the liquid or semi-liquid dextrine maltose to be treated, the said dextrine maltose flowing from the said pipe through the branch pipe *p* into the said trough. In each of these troughs is mounted a brush, C. The cylinders are slowly driven in the direction of the arrows *x* by toothed gearing $a$ from the main driving-shaft, which may be driven by any suitable motor, the gearing being preferably arranged (in any manner which may be convenient) so that either one of the cylinders may be driven while the other remains at rest, or so that both cylinders may be driven at the same time. The brushes C are mounted at such a level that their lower parts dip into the dextrine maltose contained in the troughs B, and motion of revolution in the direction of the arrows $y$ (see Fig. 4) is given to the said brushes by bands or gearing from the main shaft or otherwise, as may be found convenient.

Mounted above each of the brushes is a striker, D, (see Fig. 4,) of the length of the brush, the said striker consisting of a cylinder or a bar, as shown, carrying projecting ribs $d$, the said strikers being at such an elevation that the bristles or fibers of the brushes come into contact therewith. Motion of revolution in the direction of the arrow $z$ is also given to the strikers D by belts or gearing from the main shaft or otherwise, as may be convenient; or the said strikers may each consist of a fixed rib in place of revolving, as described, and either arrangement may be adjustable vertically, if desired.

Underneath and along the length of the cylinders are mounted knives or scrapers E, in contact with the peripheries of the said cylinders. The said knives or scrapers are illustrated separately in Figs. 5 and 6, as before mentioned. The said knives are formed in lengths or sections $e$, (see Fig. 6,) each section being held in a holder, $f$, free to turn upon a pin, $x'$, (to which it is confined by the screw $x^2$,) on a lug, $y'$, capable of turning upon a shaft, $g$, carried by brackets $h$, bolted to a framing, $i$, which is held between brackets $z'$, hinged at $z^2$ to the framing of the machine. (See Fig. 1.) The said framing-brackets are supported so that the knives are in contact with the cylinders by means of struts or otherwise, as may be convenient. The said knife-sections $e$ are held between the two plates of the holders $f$ by bolts $f^2$, which pass through slots $f^3$ in the said plates and through holes in the knife-sections, so that by slacking these screws $f^2$ they and the knife-sections may be adjusted to project more or less from the said plates, and when so adjusted they are fixed in the position to which they have been brought by retightening the said screws. The back part of the knife-sections may be separate from the front portion, if desired, so that the front portion may be readily replaced when worn. As shown in Fig. 5, each lug $y'$ has an arm, $f^4$, upon it, and on the framing $i$, at the back of each holder, is a lever or catch-piece, $i^2$, provided with a hook, $i^3$, and pivoted at $i^4$ to projecting portions of the framing $i$. Springs $k$ are connected to the arms $f^4$ and levers $i^2$, which springs support the knife-carriers $f$, so that the knives are in yielding contact with the peripheries of the cylinders A, the tails of the levers $i^2$ bearing upon pins, as at $i^5$. By this arrangement, which it is to be understood is applied to each of the knife-section carriers $f$, the said carriers or any of them may be readily caused to fall out of contact with the cylinder A when desired for any purpose. The series of knife-sections $e$ of each cylinder have a horizontal to-and-fro motion imparted to them; and this may be effected by means of a bar, $l$, extending along the length of each cylinder, sliding in bearings in the brackets $h$. Opposite each knife-section carrier $f$ these bars $l$ are furnished with lugs or projections $l^2$, embracing a lug or projection, $f^5$, upon each of the lugs $y'$ of the knife-section carriers $f$, as seen in Figs. 5 and 6. The reciprocating motion of these bars $l$ may be effected by any convenient means—as, for instance, by a slotted cross-head on the said bars operated by a crank-pin on a disk rotated from any convenient part of the machine.

Extending along between the cylinders is or may be a heated-air conduit, and attached thereto is a hood, M, overlapping the said cylinders, so that it covers and is but a short distance from the peripheries thereof, the said hood extending, by preference, at least over one quarter, or thereabout, of the peripheries of the cylinders. The said hood M is mounted upon brackets $m$ by means of screws $m^2$ at each end, by which its distance from the peripheries of the cylinders A can be adjusted. Hot air from a blower or fan or from other source, and heated in any desired way, preferably to a temperature of or about 300° Fahrenheit, is passed into the conduit, flowing out at an opening, as at $m^3$, Fig. 2, at bottom, and by the slit $m^4$, to between the cylinders, rising between the hood M and the cylinders A, and there assisting in desiccating the coating of dextrine maltose upon the said cylinders.

The action of the machine is as follows: The dextrine-maltose solution to be treated is caused to flow in a measured quantity, by a pump or equivalent regulator, into the horizontal troughs B, so that the brushes C dip thereinto preferably to or about the depth shown in Fig. 4, and the cylinders A being driven at a slow rate, and the brushes C and strikers D being also rotated in the direction shown by the arrows, the said brushes C dipping into the said dextrine maltose elevate it in small quantities, and, striking against the bars $d$ of the strikers D, the bristles of the said brush C are forced back, and as they return to their normal position the dextrine maltose is projected or thrown therefrom in the condition of froth, spray, or small drops onto the surfaces of the cylinders A, into which cylinders hot air or steam or other heating medium is admitted, as before described, hot air being also admitted to the air duct or channel communicating with the hood M. The dextrine-maltose solution, on being projected onto the hot metal of the cylinders A, as described, forms thin coatings thereon as the heat throws off the water or other liquid therefrom. These coatings adhere to the surfaces of the cylinders A, and on the further rotation of the said cylinders the said coatings are further subjected to the desiccating or drying action of the hot air escaping at the slit $m^4$, and passing between the said cylinders A and the hood M. As the cylinders A continue their revolution the dextrine maltose, which is now in a desiccated condition, is scraped off from the said cylinders by the scrapers or knife-sections e, and falls into receptacles N, placed beneath to receive it, or it may fall onto a web carrier for the purpose of being collected at any desired point.

To maintain the dextrine maltose at the desired level in the troughs B, the arrangement shown in Fig. 4 may be employed, consisting as follows: A discharge-pipe, Q, for surplus dextrine maltose communicates with each trough by the pipes $b$, $b^2$, and $q$, the pipe $b$ opening from the bottom of the trough B, and the pipe $b^2$, being a flexible pipe, connecting this pipe $b$ with the pipe $q$, which is a curved pipe rising from the discharge-pipe Q, so that its curved part is at the level at which the dextrine maltose is to be maintained in the trough, this level being adjustable by making the pipe $q$ in two parts, $q^2$ and $q^3$, as shown, the part $q^2$ being screwed on its exterior, and being provided with nuts $q^4$, by turning which in one or other direction the bent part of the pipe $q$ may be raised or lowered, and the dextrine maltose maintained at a higher or lower level in the troughs B, as any surplus dextrine maltose will flow off from the troughs by the said pipes $b$, $b^2$, and $q$ until the level of the said dextrine maltose has reached that of the highest part of the curved pipe $q$, as will be readily understood by reference to Fig. 4. A shield, $r$, is provided to intercept any dextrine maltose which may be ejected in that direction, and a guide, $s$, in contact with or in close proximity to the outer side of each cylinder, and extending along its length, may be provided, down which any surplus dextrine maltose projected upon the cylinders will flow and be returned to the troughs B.

It is to be understood that each trough B on either side may be either continuous or be formed in sections or separate lengths, constituting individual small troughs, in which case each brush will be formed in corresponding sections, and each trough-section will be provided with supply-branches $p$, and with a surplus-discharge arrangement, similar to that hereinbefore described with reference to Fig. 4. The supply-pipe P will be in communication with the outlet of a pump, or by other means will be in communication with the reservoir or receptacle containing the dextrine maltose to be treated, and the discharge-pipes Q may be led back to this reservoir or receptacle.

Although we have described the machinery or apparatus for reducing dextrine maltose to and collecting it in the dry or desiccated state, as being provided with two cylinders, A, it is to be understood that although such apparatus is preferred to be provided with two cylinders, yet there may be but one cylinder, or there may be more than two cylinders. In any case the arrangements are or may be similar to those hereinbefore described.

We do not limit ourselves to any particular specific gravity for the solution to be treated; but we have found in practice that for dextrine maltose a specific gravity of 1.100 to 1.200 for the solution gives good results.

As before stated it will be understood that the machinery or apparatus hereinbefore described may also be employed for reducing and recovering malt worts, (hopped and unhopped) glucose, and analogous substances other than dextrine maltose, or any combination of such substances, to such a dry condition that if they be not scraped off the machine in a pulverulent condition they can be easily pulverized when cold.

By treating dextrine maltose or glucose or analogous substances according to our invention, essentially as hereinbefore described, the said dextrine maltose or glucose or analogous substance may be obtained in a pulverulent or dry condition without material injury to the color and properties.

We would observe, in conclusion, that we do not claim generally the process of reducing malt worts, glucose, or analogous substances to a dry condition; but

What we claim is—

1. The treatment of dextrine maltose or hopped and unhopped malt wort or glucose by the process of drying it in films on heated surfaces, essentially as and for the purposes hereinbefore described.

2. The combination of one or more heated revolving drying-cylinders, the liquid receptacle or trough, means, substantially as described, for taking from the trough the liquid material and depositing the same in films upon the cylinder or cylinders and scrapers, or their equivalent, substantially as and for the purposes hereinbefore set forth, with or without the hot-air hood M.

3. The combination of a cylinder or cylinders, A, brush or brushes C, and striker or strikers D, essentially as and for the purposes hereinbefore described.

4. The construction of the scrapers or knives E, for use in the machines or apparatus hereinbefore described—that is to say, forming the holders $f$ of the said knives so that the knives are held in yielding contact with the desiccating-cylinders, and so that they can be readily lowered out of their acting position, essentially as hereinbefore described.

In testimony whereof we have signed our names to this specification in the presence of two subscribing witnesses.

ALEXANDER LOW BRUCE. [L. S.]
    GEORGE STENHOUSE. [L. S.]
    WILLIAM McCOWAN. [L. S.]
    ANDREW HADDOW. [L. L.]

Witnesses:
 GEORGE JAMES CUMMING,
  10 *Comely Green Place, Edinburgh.*
 PETER PATON,
  42 *Canongate, Edinburgh.*